W. D. NASON.
BEET PULLER.
APPLICATION FILED DEC. 21, 1908.
919,748.
Patented Apr. 27, 1909.
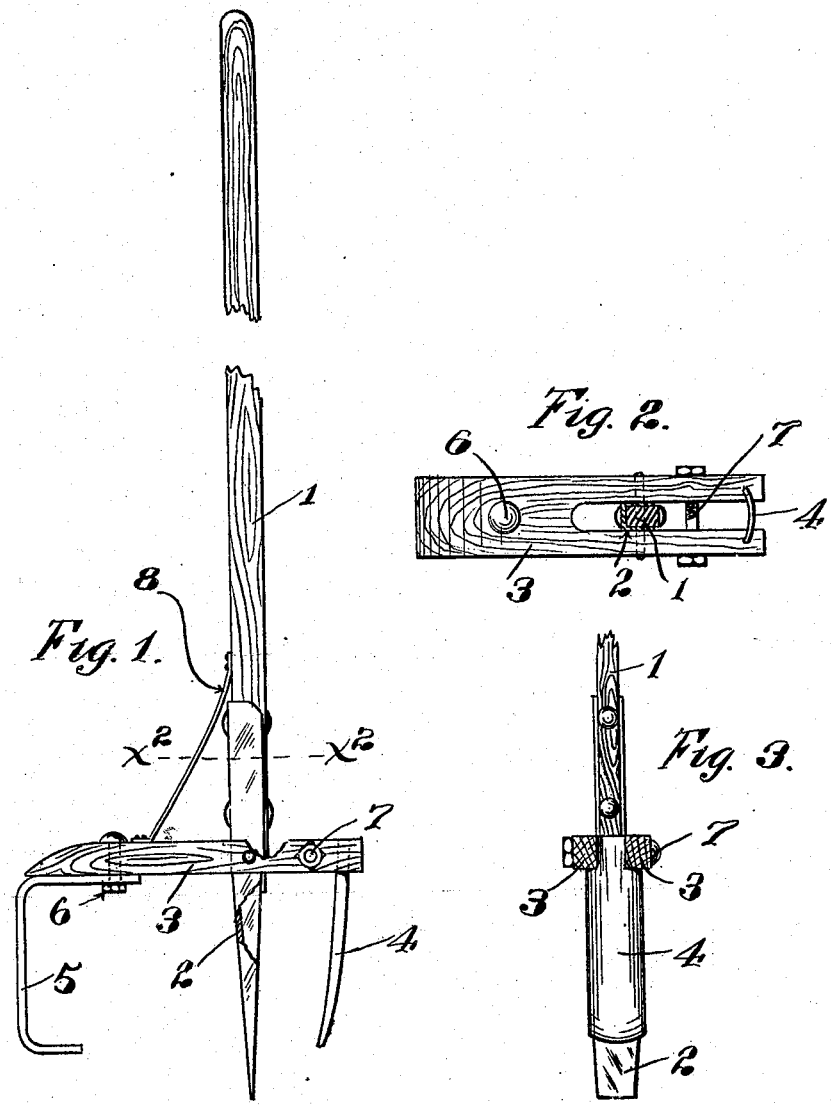
Witnesses —
R. L. Hicks.
A. H. Opsahl.
Inventor-
Wint Dexter Nason
By his Attorneys
Williamson Merchant

UNITED STATES PATENT OFFICE.

WIRT DEXTER NASON, OF LE ROY, MINNESOTA.

BEET-PULLER.

No. 919,748.     Specification of Letters Patent.     Patented April 27, 1909.

Application filed December 21, 1908. Serial No. 468,486.

*To all whom it may concern:*

Be it known that I, WIRT DEXTER NASON, citizen of the United States, residing at Le Roy, in the county of Mower and State of Minnesota, have invented certain new and useful Improvements in Beet-Pullers; and I do hereby declare the following to be a full, clear, and exact description of the invention, such as will enable others skilled in the art to which it appertains to make and use the same.

My invention has for its object to provide a simple and efficient device for pulling beets and similar vegetables, and to this end, it consists of the novel devices and combinations of devices hereinafter described and defined in the claims.

In the accompanying drawings which illustrate the invention, like characters indicate like parts throughout the several views.

Referring to the drawings: Figure 1 is a view in side elevation, with some parts broken away, showing the improved puller; Fig. 2 is a horizontal section taken on the line $x^2$ $x^2$ of Fig. 1; and Fig. 3 is a front elevation of the device some parts being broken away.

A wooden lever or hand bar 1 is provided at its lower end with a blade 2, preferably formed channel shaped and tapered to a sharp edge at its lower end. Extending transversely of, and intermediately pivoted to the lower end portion of the lever 1 and to the flanged upper portion of the blade 2, is a rocking cross bar or lever 3, to one end of which a depending blade 4 is secured, and to the other end of which a depending fulcrum bracket 5, shown as afforded by a bent metal strap, is rigidly secured as shown by means of a nutted bolt 6. The bar 3 from its central portion toward its right hand end, as shown in Figs. 1 and 2, is bifurcated so that it straddles the lever 1 and the upper end of the blade 4, and it is provided with a nutted clamping bolt 7 which serves to draw the prongs of the said bar tightly onto the upper end of the blade 4, thereby rigidly but detachably holding the latter. A flexible strap 8 attached at its upper end to the lever 1 and at its lower end to the left hand end portion of the bar 3, limits the movement of the blade 4 away from the blade 2.

In pulling a beet by the use of this device, the device when its blades 2 and 4 are in the relative positions shown in Fig. 1, is forced into the ground with one blade on each side of the beet. Then the beet is pulled by movement of the lever, so as to throw the weight and the pulling strain onto the fulcrum bracket 5, which latter will be tightly pressed against the ground and serve as a base of reaction for the device in pulling the beet out of the ground. The very great leverage afforded by this device, makes the pulling of a beet a very easy matter. As is evident, in the pulling action, the blade 4 is forced toward the blade 2, so that the two blades tightly grip and hold the beet while it is being pulled.

In raising beets in large quantities as is done for sugar producing purposes, the pulling of beets requires a large amount of labor. Large beets, which are rooted deep in the ground, are very hard to pull with the hands, but with this improved device, the most deeply rooted beets may be very quickly and easily pulled.

What I claim is:

1. In a puller of the kind described, the combination with a lever and a cross bar intermediately pivoted thereto, of a pair of coöperating pulling blades, one secured to the lower end of said lever and the other secured to and depending from one end of said cross bar, a ground engaging fulcrum bracket secured to the other end of said cross bar, and a connection for limiting the movement of said two blades toward each other, substantially as described.

2. In a puller of the kind described, the combination with a lever and a bifurcated cross bar intermediately pivoted thereto, a pulling blade secured to the lower end of said lever, a second pulling blade inserted between the prongs of said bifurcated bar, a nutted bolt passed through the prongs of said bifurcated bar, clamping the same onto the said interposed blade, and a fulcrum bracket applied to the other end of the said bar, substantially as described.

In testimony whereof I affix my signature in presence of two witnesses.

WIRT DEXTER NASON.

Witnesses:
GEO. W. HARDEN,
A. J. HAYES.